United States Patent [19]
Tempel

[11] Patent Number: 6,145,476
[45] Date of Patent: Nov. 14, 2000

[54] FISH HOLDING SYSTEM

[75] Inventor: Mark Alan Tempel, Issaquah, Wash.

[73] Assignee: Northwest Marine Technology, Inc., Shaw Island, Wash.

[21] Appl. No.: 09/156,626

[22] Filed: Sep. 18, 1998

[51] Int. Cl.⁷ .................................................. A01K 63/02
[52] U.S. Cl. ............................................ 119/215; 119/203
[58] Field of Search ............................... 119/200, 201, 119/203, 215, 216; 43/54.1, 105

[56] References Cited

U.S. PATENT DOCUMENTS

| | | | |
|---|---|---|---|
| 4,844,012 | 7/1989 | Jerrett | 119/203 |
| 5,117,777 | 6/1992 | Takasugi | 119/203 |
| 5,220,880 | 6/1993 | Alworth et al. | 119/215 |
| 5,463,983 | 11/1995 | Nagaura | 119/215 |

*Primary Examiner*—Peter M. Poon
*Assistant Examiner*—Elizabeth Shaw
*Attorney, Agent, or Firm*—Kenyon & Kenyon

[57] ABSTRACT

An holding apparatus immobilizes a fish of a known and fixed orientation. The holding apparatus includes a vessel having a set of walls defining an interior chamber into which the fish and water can be located. The walls of the vessel have a restraining configuration and a non-restraining configuration. The walls of vessel, when in a restraining configuration, are at least partially conforming to a shape of a fish located within the interior chamber of the vessel.

25 Claims, 6 Drawing Sheets

FISH HOLDING SYSTEM

BACKGROUND OF THE INVENTION

The present invention relates generally to the fields of pisciculture and aquatic resource management. More specifically, the present invention relates to an apparatus and method for immobilizing a non-anesthetized fish of a known and fixed orientation.

Pisciculture is the breeding, hatching, and rearing of fish under controlled conditions, in either fresh or salt-water environments, as a science or industry. Aquatic resource management involves the management of natural fish populations, as well as the management of governmental fish hatcheries where fish are raised for eventual release into the wild.

In both fields, it is often necessary to perform routine fish handling operations on a large number of live fish. Examples of these operations include sorting fish by size, electronic counting, automated vaccinations, and fish tagging/marking.

One method of marking fish is to remove the adipose fin of the fish to indicate the particular origin of the fish. For example, known fish hatcheries remove the adipose fin of hatchery-born fish by hand to distinguish the hatchery-born fish from native fish. To remove the adipose fin by hand, the fish must be anesthetized, picked up by hand, have its adipose fin cut, for example, by scissors, and then revived. To perform any additional marking, such as inserting tags, the fish must be further again anesthetized before the additional marking.

This type of marking by hand, however, suffers from several shortcomings. First, the number of fish that can be marked by hand is limited. For example, twelve people removing the adipose fin of fish by hand can process approximately only 40,000 fish during an eight hour shift. Second, repeatedly anesthetizing the fish is unhealthy for the fish and can result in numerous fish deaths. Third, the natural habitat of the fish can be unfriendly for the persons performing the marking by hand. For example, where the natural habitat of the fish is very cold water, this cold water can be very uncomfortable to the persons performing the marking by hand over the period of several hours.

It would be desirable to automate operations such sorting fish by size, electronic counting, automated vaccinations, and fish tagging/marking. One problem in automating such operations is that the fish of a known orientation need to be held so that the appropriate operations can be performed on a repeated and high volume basis.

SUMMARY OF THE INVENTION

An holding apparatus immobilizes a fish of a known and fixed orientation. The holding apparatus includes a vessel having a set of walls defining an interior chamber into which the fish and water can be located. The walls of the vessel have a restraining configuration and a non-restraining configuration. The walls of vessel, when in a restraining configuration, are at least partially conforming to a shape of a fish located within the interior chamber of the vessel.

In another embodiment, the holding apparatus includes a left side plate and a right side plate each having an adjustable front portion and an adjustable rear portion. The left side plate and the right side plate define an interior chamber. The adjustable portions of the left side plate and the right side plate can be moved towards a fish located with in the interior chamber to substantially conform to the fish shape.

In some embodiments, the left side plate and the right side plate each can include a continuous, pressure-absorbing layer facing the interior chamber. The shape of each continuous pressure-absorbing layer can be adjusted as the adjustable portions of the left side plate and the right side plate are moved. The left side plate and the right side plate each can include a cut-away portion substantially aligned with an exposed portion of a fish located within the interior chamber. The exposed portion of the fish located within the interior chamber can be, for example, an adipose fin.

In other embodiments, the adjustable rear portions of the left side plate and right side plate each can have a tapered shape narrower towards the entry end and broader towards the exit end. The adjustable rear portions of the left side plate and the right plate can move towards a fish located within the interior chamber an amount greater than the adjustable front portions of the left side plate and the right side plate.

DETAILED DESCRIPTION

Figure 1:
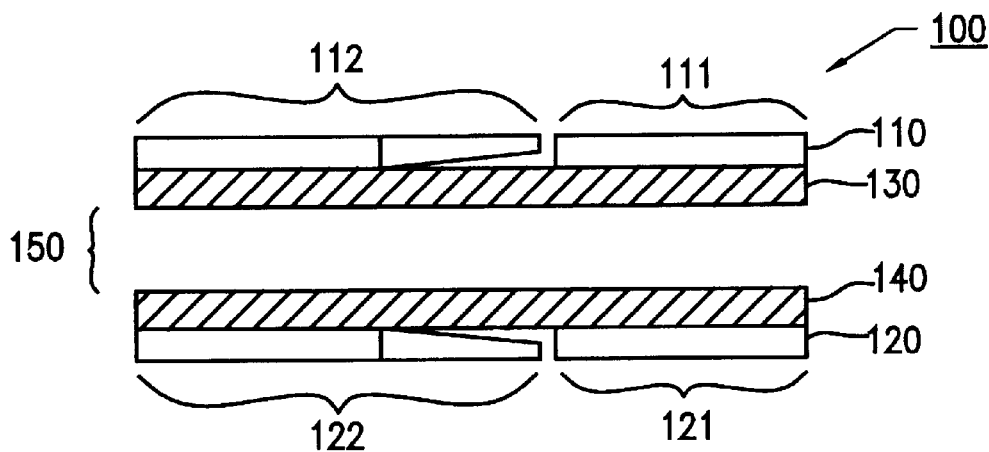
FIG. 1 shows a top view of the holding apparatus while in a non-restraining configuration, according to an embodiment of the present invention.

FIG. 1 shows a top view of the holding apparatus while in a non-restraining configuration, according to an embodiment of the present invention. The holding apparatus immobilizes fish of a known and fixed orientation so that the fish can processed by, for example, automated equipment.

The holding apparatus has several characteristics that can restrain fish while keeping the fish in an environment that calms the fish and minimizes fish mortality. The holding apparatus can allow the fish to enter an interior chamber while surrounding the fish with flowing water which helps to keep the fish calm. The interior chamber can enclose the fish completely also helping to keep the fish calm. The interior chamber can have black walls each with a continuous pressure-absorbing layer that apply substantially uniform pressure. The black color of the interior chamber provide an unlighted environment typical for the fish. Because each pressure absorbing layer can be continuous, the fish can enter and exit the interior chamber of the holding apparatus without restriction.

Where the holding apparatus is used to restrain fish to allow automated marking of the fish by automatically removing the adipose fin of the fish, the holding apparatus provides greatly improved capacity over holding/marking by hand. Specifically, a two person crew operating the holding apparatus and associated automated marking equipment can process approximately 120,000 fish per day, unlike the known method of holding and marking the fish by hand where twelve people removing the adipose fin by hand can process approximately only 40,000 fish per day (during an eight hour shift).

Returning to FIG. 1, the holding apparatus 100 is a vessel having a left side plate 110 and a right side plate 120. Left side plate 110 includes adjustable front portion 111 and adjustable rear portion 112. Right side plate 120 includes adjustable front portion 121 and adjustable rear portion 122. The movement of the adjustable portions of the side plates towards each other can be controlled by, for example, a pair of stepper motors. Left side plate 110 and right side plate 120 can be made of a material suitable for a water environment while providing sufficient rigidity to restrain the fish while the holding apparatus is in a restraining configuration. For example, left side plate 110 and right side plate 120 can be made of metal.

Pressure absorbing layer 130 is attached to left side plate 110; pressure absorbing layer 140 is attached to right side plate 120. Pressure absorbing layers 130 and 140 each can be continuous along the length of interior chamber 150 thereby eliminating any discontinuities in right side plate 110 and left side plate 120, respectively, to allow unrestricted entry and passage of the fish into interior chamber 150.

Pressure absorbing layers 130 and 140 can be made of any material suitable for water environment that can absorb the pressure applied when the holding apparatus is in a restraining configuration. In other words, pressure absorbing layers 130 and 140 can be made of a material that absorb the pressure applied to the fish while the holding apparatus is in a restraining configuration while also restraining the fish. For example, pressure absorbing layers 130 and 140 can be made of foam such as a closed cell foam and can be replaceable.

The respective sides of pressure absorbing layers 130 and 140 facing the interior chamber 150 can be colored, for example, black to keep the environment within interior chamber 150 dark, more closely resembling the natural environment of the fish. Interior chamber 150 is the space within the holding apparatus 100 having boundaries defined, in part, by the left side plate 110, pressure absorbing layer 130 and right side plate 120 and pressure absorbing layer 140.

A fish of a known and fixed orientation can enter into interior chamber 150. Fish can enter the interior chamber of the holding apparatus in a known and fixed orientation by using the system and method described in the pending patent application entitled "Device and Method for Volitionally Orienting Fish", U.S. Ser. No. 08/627,763, filed on Mar. 29, 1996, and incorporated herein by reference.

As shown in FIG. 1, the fish can enter interior chamber 150 from left to right corresponding to the flow of the water into interior chamber 150. The fish can be non-anesthetized and can swim into the interior chamber of the holding apparatus with the flow of water. By holding and processing the fish without anesthetizing it, the mortality rate is greatly reduced compared to holding and processing the fish by hand.

The lateral progress of the fish within the interior chamber 150 can be stopped by a head mold (not shown in FIG. 1, but discussed below in conjunction with FIGS. 4 through 6) located at the exist end of the interior chamber 150. In other words, the fish's head presses against the head mold to restrain the fish within the interior chamber 150 while the water can continue to flow within the interior chamber 150. By allowing the fish to enter the holding apparatus while the fish is surrounded with flowing water, the fish remains more calm because an environment with flowing water is more typical for the fish.

Figure 2:
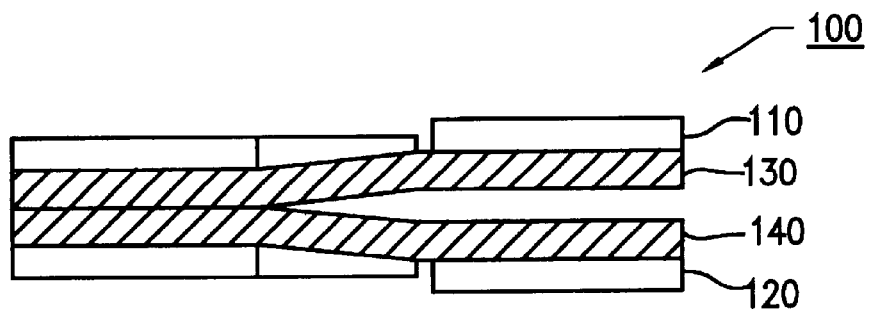
FIG. 2 shows a top view of the holding apparatus while in the restraining configuration, according to the embodiment shown in FIG. 1.

FIG. 2 shows a top view of the holding apparatus while in the restraining configuration, according to the embodiment shown in FIG. 1. In the restraining configuration, the left side plate 110 and right side plate 120 close towards each other to allow pressure absorbing layers 130 and 140 to conform to the shape of the fish while also restraining the fish in a fixed position. The holding apparatus can have a sensor system (not shown) that can determine when the fish is in position so that the holding apparatus should be changed from a non-restraining configuration to a restraining configuration. The sensor system can be, for example, an electro-optical system to detect when the fish is in position to be restrained. Note that when in the restraining configuration, the adjustable rear portions 112 and 122 of left side plate 110 and right side plate 120, respectively, can move closer together than the adjustable front portions 111 and 121 of left side plate 110 and right side plate 120, respectively.

Figure 3:
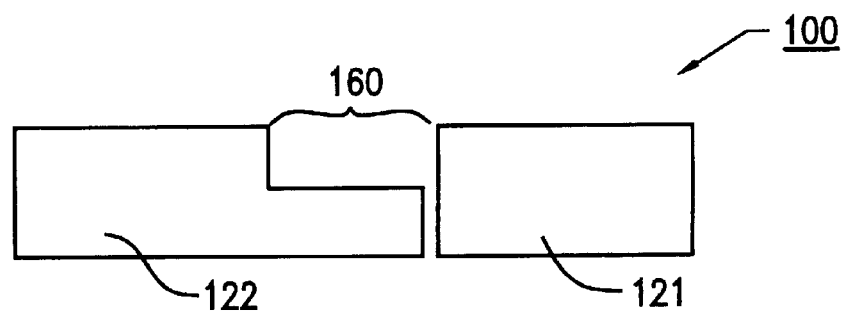
FIG. 3 shows a side view of the holding apparatus, according to the embodiment shown in FIGS. 1 and 2.

FIG. 3 shows a side view of the holding apparatus, according to the embodiment shown in FIGS. 1 and 2. As shown in FIG. 3, adjustable front portion 121 and adjusting rear portion 122 of right side plate 120 are shown. As can be seen in FIG. 3, adjustable rear portion 122 of right side plate 120, adjustable rear portion 112 of left side plate 110, and pressure absorbing layers 130 and 140 each have a portion, collectively referred to herein as cutaway portion 160, which exposes an area of the fish being restrained within interior chamber 150. The cutaway portion 160 allows the exposed area of the fish to be processed, for example, to allow the adipose fin of the fish to be cut or to allow a portion of the fish to be tagged or marked.

FIG. 4 again shows the top view of the holding apparatus, according to the embodiment shown in FIGS. 1 through 3, with a fish within the interior chamber while the holding apparatus is in a non-restraining configuration. Holding apparatus 100 also includes a head mold 170. Head mold 170 can be made of a material like the material from which the pressure absorbing layers 130 and 140 are made. The holding apparatus 100 can include a bottom plate (not shown in FIGS. 1 through 6) attached to the head mold 170 at the bottom side of the interior chamber 150. The bottom plate and head mold 170 can be rotated away from interior chamber 150 to allow a fish located with the interior chamber 150 to be released when appropriate. The movement of the bottom plate and head mold 170 can be controlled by, for example, an electrical actuator (not shown).

Figure 4:
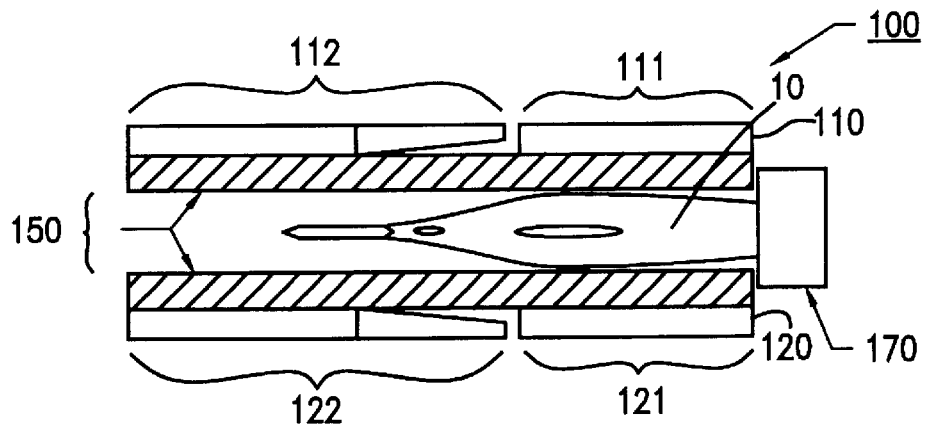
FIG. 4 again shows the top view of the holding apparatus, according to the embodiment shown in FIGS. 1 through 3, with fish within the interior chamber while the holding apparatus is in a non-restraining configuration.

In the embodiment shown in FIG. 4, the left side plate 110 and right side plate 120 are substantially parallel to each other and head mold 170 is substantially perpendicular to side plates 110 and 120. Fish 10 can enter interior chamber 150 from the left side of FIG. 4 and pass through interior chamber 150 until the head of the fish contacts head mold 170.

Figure 5:
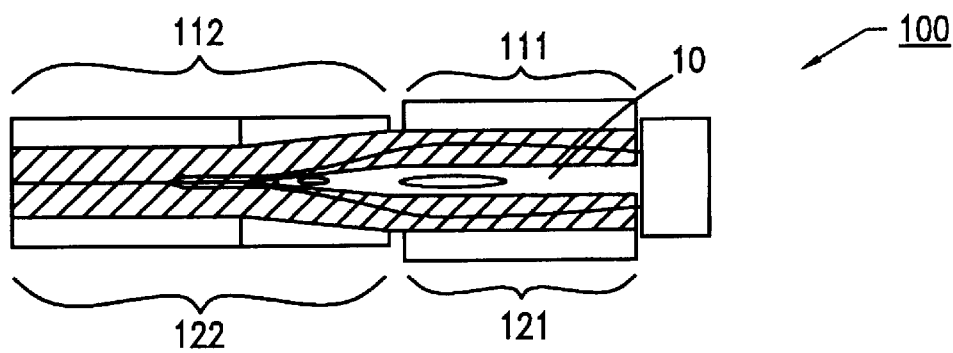
FIG. 5 shows a top view of the holding apparatus, according to the embodiment shown in FIGS. 1 through 4, with the fish within interior chamber while the holding apparatus is in a restraining configuration.
Figure 6:
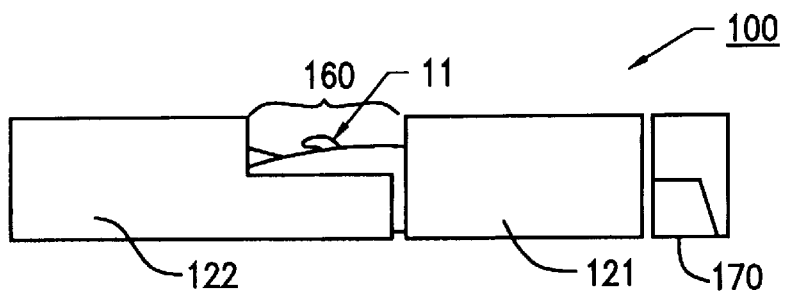
FIG. 6 again shows a side view of the holding apparatus, according to the embodiment shown in FIGS. 1 through 5, with a fish located within the interior chamber while the holding apparatus is in a restraining configuration.

FIG. 5 shows a top view of the holding apparatus, according to the embodiment shown in FIGS. 1 through 4, with the fish within interior chamber while the holding apparatus is in a restraining configuration. Left side plate 110, right side plate 120, and pressure absorbing layers 130 and 140, respectively, move towards each other to conform to the shape of fish 10.

Note that the adjustable front portions 111 and 121 move a shorter distance towards each other than the adjustable rear portions 112 and 122. This allows the fish to be restrained with nearly equal pressure across the body of the fish and allows the rear portions 112 and 122 to better conform to the tapered shape of the rear of the fish. Note also that the fish can be enclosed completely by left side plate 110, right side plate 120 and pressure absorbing layers 130 and 140; completely enclosing the fish helps to keep the fish calm.

FIG. 6 again shows a side view of the holding apparatus, according to the embodiment shown in FIGS. 1 through 5, with a fish located within the interior chamber while the holding apparatus is in a restraining configuration. Note that the cutaway portion 160 exposes a portion of the fish so that exposed portion of the fish may be processed while being held. In the example shown in FIG. 6, the adipose fin 11 of the fish 10 is exposed. In this example, the adipose fin can be easily removed to allow for marking fish 10; in other words, the exposed adipose fin can be automatically removed to mark the fish as originating from the fish hatchery. Once the processing of the fish is completed, the head mold 170 can be removed thereby releasing the fish into the flowing water so that fish 10 can exit interior chamber 150.

Figure 7:
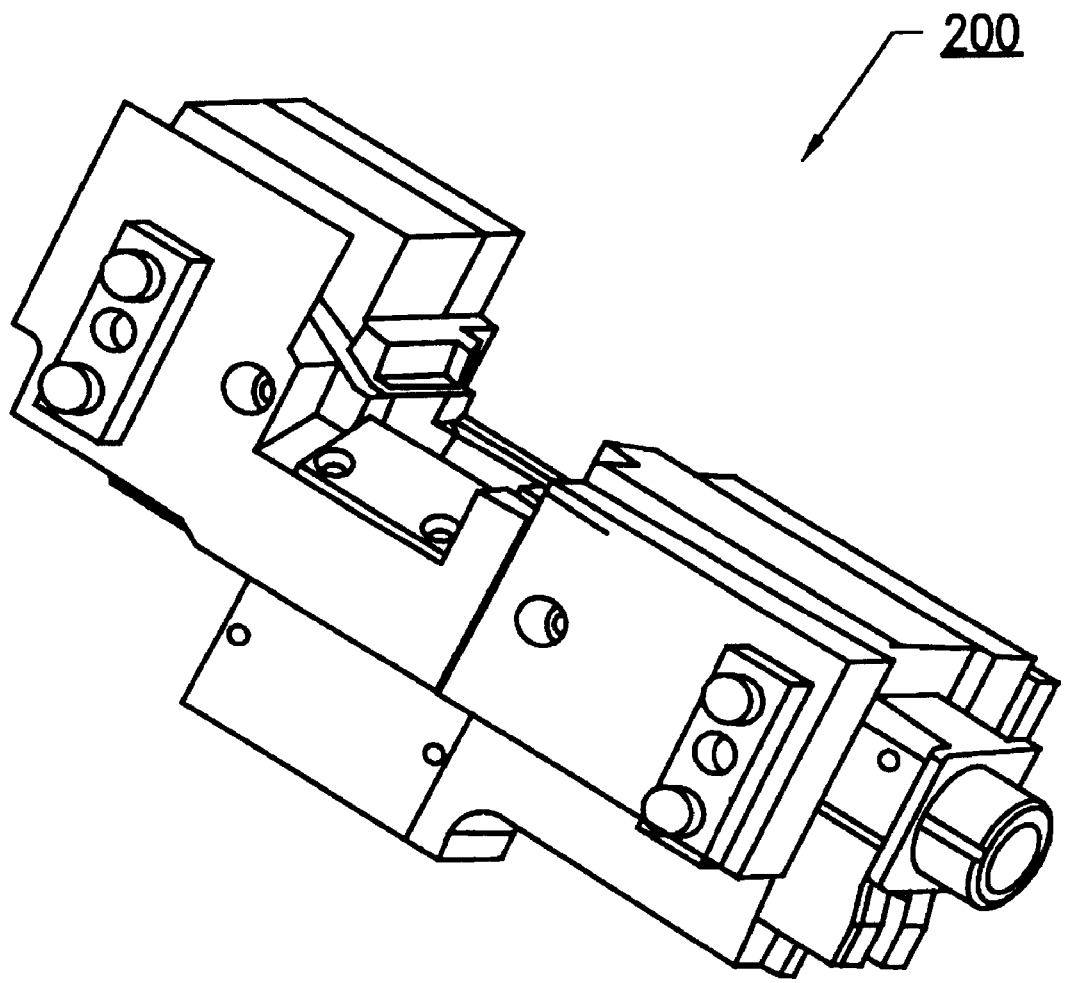
FIG. 7 illustrates a perspective view of the holding apparatus, according to another embodiment of the present invention.

FIG. 7 illustrates a perspective view of the holding apparatus, according to another embodiment of the present invention, while the holding apparatus is in a non-restraining configuration. As shown in FIG. 7, the fish enters an interior chamber (not shown) of holding apparatus 200 from the top left side of the figure while the holding apparatus 200 is in a non-restraining configuration. The fish is restrained while the holding apparatus 200 is in a restraining configuration, the fish can be processed and then released from the holding apparatus 200 (out the lower right hand side of FIG. 7).

Figure 8:
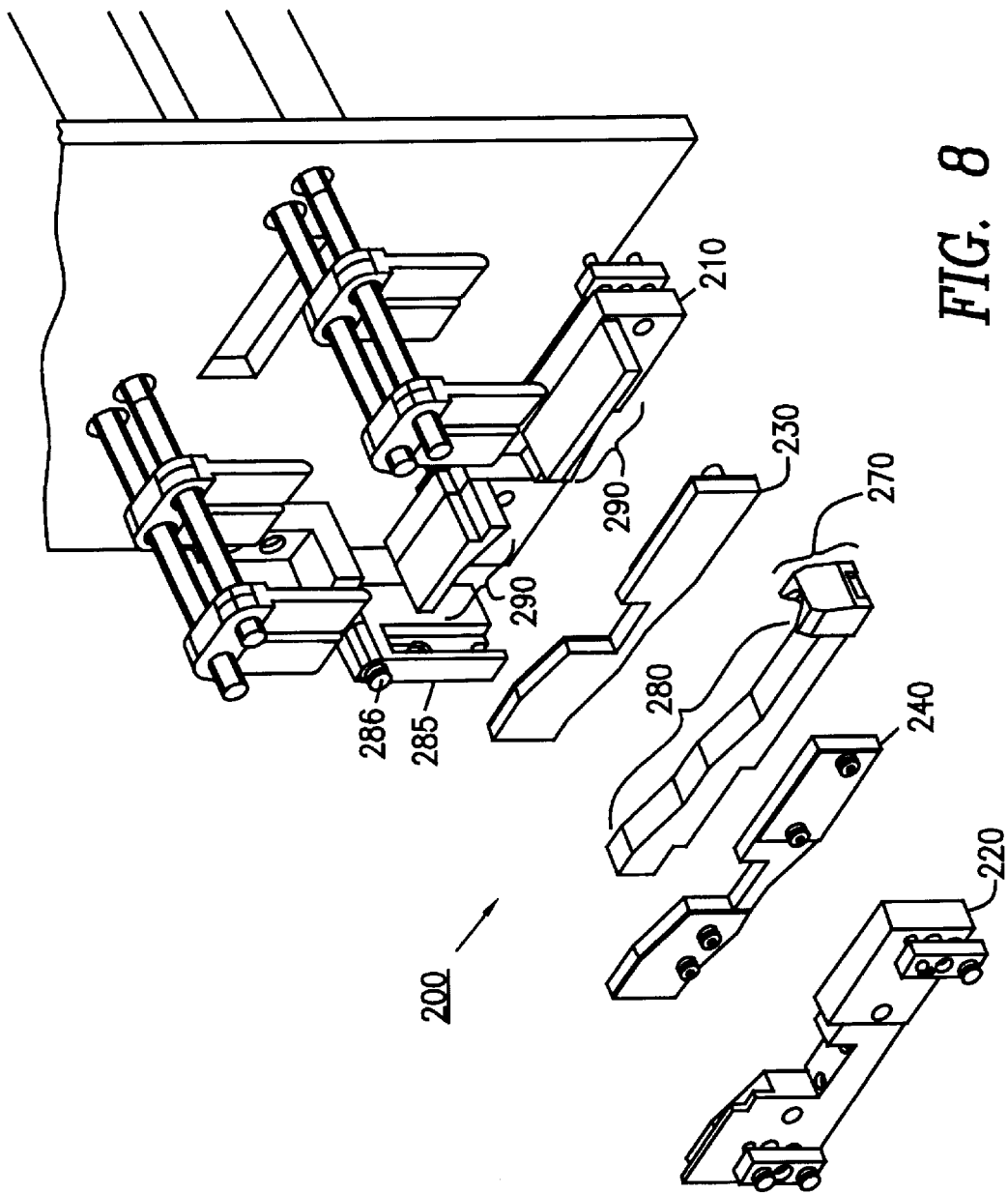
FIG. 8 shows an exploded view of the holding apparatus, according to the embodiment shown in FIG. 7, and shows additional equipment onto which the holding apparatus can connect.

FIG. 8 shows an exploded view of the holding apparatus, according to the embodiment shown in FIG. 7, and shows additional equipment onto which the holding apparatus can connect. Holding apparatus 200 as shown in FIG. 8 includes left side plate 210, pressure absorbing layer 230, right side plate 220, pressure absorbing layer 240 and head mold 270.

Figure 9:
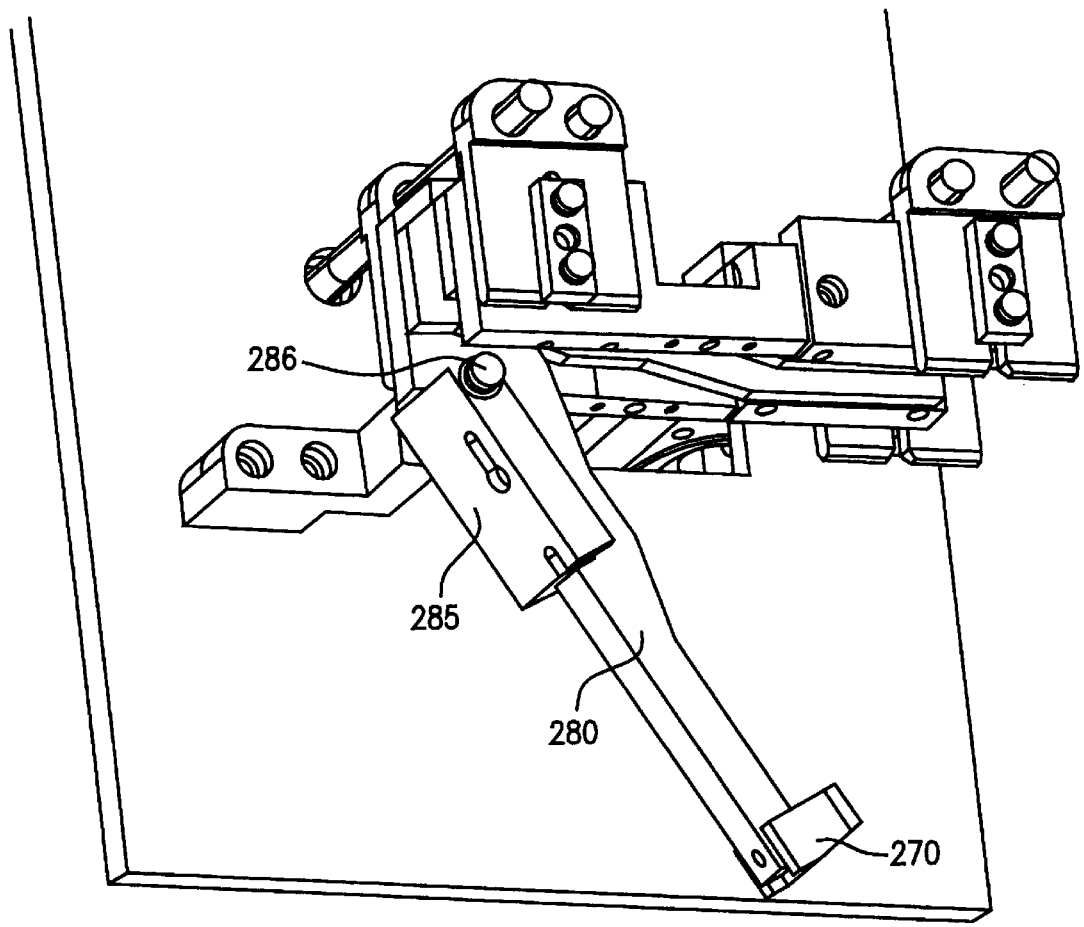
FIG. 9 illustrates the holding apparatus, according to the embodiment shown in FIG. 8, and its attachment plate, bottom plate and head mold in a lowered position to release a fish located within the interior chamber.

Also shown in FIG. 8 is bottom plate 280 which is connected to head mold 270, top plate 290 which is connected to left side plate 210, and attachment plate 285. Attachment plate 285 can be rotatably attached to pin 286 and connected to bottom plate 280 so that attachment plate 285, bottom plate 280 and head mold 270 can be moved into various positions. For example, attachment plate 285, bottom plate 280 and head mold 270 can be lowered to release a fish located within interior chamber 150 or raised into the bottom of interior chamber to receive a fish into the interior chamber of holding apparatus 200. FIG. 9 illustrates attachment plate 285, bottom plate 280 and head mold 270 in a lowered position to release a fish located within the interior chamber.

Figure 10:
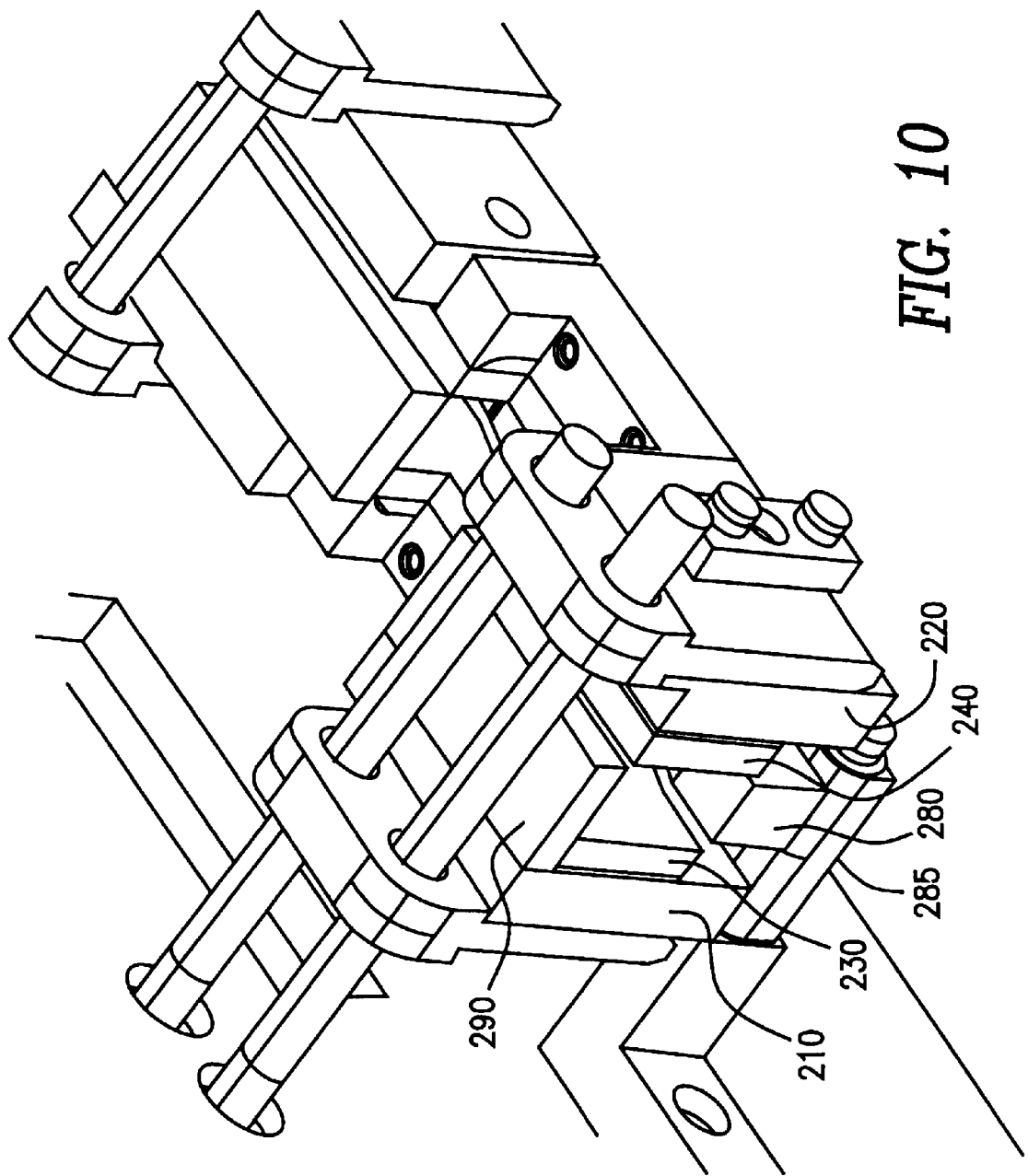
FIG. 10 illustrates a rear prospective view of the holding apparatus, according to the embodiment shown in FIGS. 8 and 9.

FIG. 10 illustrates a rear prospective view of the holding apparatus, according to the embodiment shown in FIGS. 8 and 9. As FIG. 10 shows, the interior chamber has a entry towards to the rear of the holding apparatus 200 where the fish can enter into the holding apparatus. The entry to the interior chamber is surrounded by bottom plate 280, pressure absorbing layers 230 and 240, and top plate 290. Also shown in the rear prospective view of FIG. 10 is left and right side plates 210 and 220, respectively, and attachment plate 285.

It should, of course, be understood that while the present invention has been described in reference to particular system components and configurations, other system components and configurations should be apparent to those of ordinary skill in the art. For example, the size of the interior chamber of the holding apparatus can be selected to be appropriate for the particular type fish or grade of fish to be restrained in the holding apparatus. In other words, the side plates and the pressure absorbing layers can be changed to accommodate the particular type or grade of fish being restrained with the holding apparatus. For another example, the cutaway portion of the side plates and pressure absorbing layers can be varied to expose the desired section of fish.

What is claimed is:

1. A holding apparatus for immobilizing a fish of a known and fixed orientation, comprising:
   a vessel having a plurality of walls defining an interior chamber into which the fish and water can be located, the walls of said vessel having a restraining configuration and a non-restraining configuration,
   the walls include a left wall, a right wall and a head mold wall,
   the left wall and the right wall each include an adjustable front portion and an adjustable rear portion.

2. The apparatus of claim 1, wherein:
   the walls of said vessel, when in a restraining configuration, being at least partially conforming to a shape of a fish located within the interior chamber of said vessel.

3. The apparatus of claim 1, wherein the left wall and the right wall of said vessel each include a continuous pressure-absorbing layer facing the interior chamber.

4. The apparatus of claim 1, wherein:
   the left wall and the right wall of said vessel each include a continuous pressure-absorbing layer facing the interior chamber,
   the shape of each continuous pressure-absorbing layer differing when the walls of said vessel are in the restraining configuration and in the non-restraining configuration.

5. The apparatus of claim 1, wherein the left wall and the right wall each include a cut-away portion substantially aligned with an exposed portion of a fish located within the interior chamber and the walls of said vessel are in a restraining configuration.

6. The apparatus of claim 5, wherein the exposed portion of the fish located within the interior chamber is an adipose fin.

7. The apparatus of claim 1, wherein the rear portion of the left wall and the right wall each has a tapered shape narrower towards an entry end of the interior chamber and an exit end of the interior chamber.

8. The apparatus of claim 1, wherein the walls further include a top wall disposed at a top portion of the interior chamber and a bottom wall disposed at a bottom portion of the interior chamber.

9. The apparatus of claim 1, wherein the rear portion of the left wall and the right wall move together a greater amount than the front portion of the left wall and the right wall when the walls of the vessel are in a restraining configuration.

10. The apparatus of claim 1, wherein the walls provide a consistent clamping pressure on the fish located within the interior chamber when the walls are in a restraining configuration.

11. A holding apparatus for immobilizing a fish of a known and fixed orientation, comprising:
   a left side plate having an adjustable front portion and an adjustable rear portion,
   a right side plate having an adjustable front portion and an adjustable rear portion,
   the left side plate and the right side plate defining an interior chamber, the adjustable portions of the left side plate and the right side plate to be moved towards a fish located with in the interior chamber to substantially conform to the fish shape.

12. The apparatus of claim 11, wherein the left side plate and the right side plate are disposed about a central axis.

13. The apparatus of claim 11, further comprising a head mold disposed substantially perpendicular to the adjustable front portions of the left side plate and the right side plate.

14. The apparatus of claim 13, further comprising:
   a top plate being disposed at a top portion of the interior chamber and substantially perpendicular to the head mold; and
   a bottom plate being disposed at a bottom portion of the interior chamber and substantially perpendicular to the head mold.

15. The apparatus of claim 11, wherein the left side plate and the right side plate each includes a continuous, pressure-absorbing layer facing the interior chamber, the shape of each continuous pressure-absorbing layer being adjusted as the adjustable portions of the left side plate and the right side plate are moved.

16. The apparatus of claim 11, wherein the left side plate and the right side plate each include a cut-away portion substantially aligned with an exposed portion of a fish located within the interior chamber.

17. The apparatus of claim 16, wherein the exposed portion of the fish located within the interior chamber is an adipose fin.

18. The apparatus of claim 11, wherein:
   the left side plate and the right side plate each include an cut-away portion substantially aligned with the adipose fin of a fish located within the interior chamber,
   the cut-away portion of the left side plate and the right side plate exposing the adipose fin of the fish when the fish is located within the interior chamber.

19. The apparatus of claim 11, wherein the adjustable rear portion of the left side plate and the right side plate each has a tapered shape narrower towards the entry end and broader towards the exit end.

20. The apparatus of claim 11, wherein the adjustable rear portions of the left side plate and the right plate move towards a fish located within the interior chamber an amount greater than the adjustable front portions of the left side plate and the right side plate.

21. A method for immobilizing a non-anesthetized fish within a vessel having a plurality of side plates which define an interior chamber through which water can flow, comprising:
   (a) receiving the fish in a known and fixed orientation within the interior chamber of the vessel; and
   (b) moving an adjustable portion of each side plate towards the fish to substantially conform to the fish shape.

22. The method of claim 21, wherein the fish is received in said receiving step (a) within the interior chamber of the vessel so that the forward progress of the fish is stopped by a head mold of the vessel.

23. The method of claim 22, further comprising:
   (c) releasing the fish from the interior chamber by the following substeps:
      (i) moving the adjustable portion of each side plate away from the fish;
      (ii) moving the head mold out of the forward progress of the fish.

24. The method of claim 21, wherein the adjustable portion of each side plate has a smaller height than the remaining portions of each side plate, the smaller height of the adjustable portion of each side plate exposing a portion of the fish.

25. The method of claim 21, wherein the exposed portion of the fish is the adipose fin.

* * * * *